Feb. 25, 1936.　　　W. S. AUSTIN　　　2,031,584
AXLE DRIVING CONSTRUCTION
Filed Sept. 11, 1933　　　4 Sheets-Sheet 1

Fig. 1.

Inventor
Walter S. Austin
By Liverance
and
Van Antwerp
Attorneys

Feb. 25, 1936.  W. S. AUSTIN  2,031,584

AXLE DRIVING CONSTRUCTION

Filed Sept. 11, 1933  4 Sheets-Sheet 4

Inventor
Walter S. Austin
By Liviciauer &
Van Antwerp
Attorneys

Patented Feb. 25, 1936

2,031,584

UNITED STATES PATENT OFFICE 2,031,584

AXLE DRIVING CONSTRUCTION

Walter S. Austin, Grand Rapids, Mich.

Application September 11, 1933, Serial No. 688,886

23 Claims. (Cl. 74—366)

This invention relates to axle driving construction and more particularly to the type known as "two speed" axles especially adapted for automobiles in which either of two driving gear ratios may be utilized by the mere shifting of a clutch whereby the so-called direct engine drive to the rear axle of an automobile may be at a relatively high or low speed.

It is well known that devices of this general character exist in the prior art almost universally using straight bevel gear pinions to drive the ring gears connected with the rear axle through suitable differential mechanism and the principal objects of the present invention are to provide a construction adapted to effectively permit the use of spiral bevelled driving pinions which is arranged in a most compact space, which is sufficiently strong in all parts to withstand the severe strain to which it is put in operation, to provide suitable bearings for the various rotating parts, to provide a clutch which may be freely shifted under ordinary driving conditions and to provide readily accessible means for adjusting the clearance between the intermeshing sets of gears without disassembling any part of the structure.

The invention provides various novel features of construction and arrangement as hereinafter more fully described and particularly pointed out in the claims reference being had to the accompanying drawings, in which.

Like reference numbers refer to like parts in all the figures.

The conventional rear axle of an automobile comprises, the gear housing 1 centrally located and having axle housings 2 extending from the respective sides thereof formed and secured either integrally or otherwise, this invention being applicable to all makes of motor vehicles. The split axle shafts 3 extend through the tubular axle housings 2 into the gear housing 1 and are provided with axle bearings 4. The inner ends of the shafts 3 are connected to conventional differential gearing within the differential gear casing 5 and two spiral bevel ring gears 6 and 7 are attached to the differential gear casing 5, the outer gear 6 being of larger diameter than the inner gear 7. The aforedescribed parts are common to all of the modifications of the present invention herein shown and described.

The term "forward" as used hereafter is intended to mean in a direction toward the driving shaft or toward the front of an automobile and the term "rear" is in the opposite direction.

Figure 1:
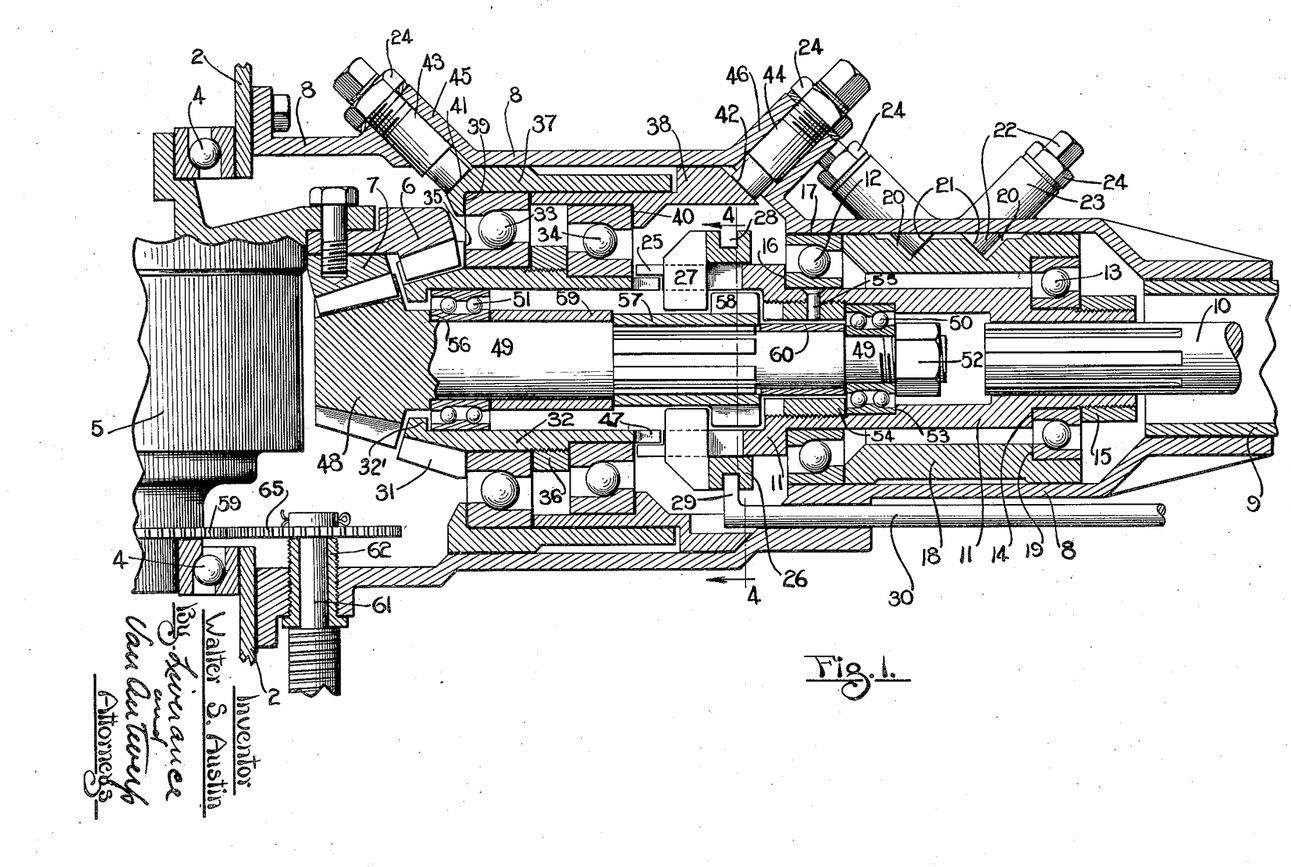
Fig. 1 is an axial sectional view of a device embodying the invention showing fragments of the conventional differential gear casing and ring gears which are a part of the ordinary rear axle of an automobile.

Description of structure of Fig. 1

Referring to the structure illustrated in Fig. 1, a substantially cylindrical housing 8 extends from one side of the gear housing 1 and is attached thereto in a conventional manner. This housing contains the various parts which constitute the present invention and is of different diameters at different locations in its length, its forward end being connected with the conventional tubular drive shaft housing 9.

The drive shaft 10, which is driven by the engine of the automobile through the customary transmission gears, has its rear end splined and joined by sliding into a correspondingly splined axial opening in a drive sleeve 11. The drive sleeve 11 is rotatably supported on two sets of ball bearings 12 and 13. The forward bearing 13 fits over a reduced portion of the drive sleeve 11 and against a shoulder 14 thereon and is held in this position by a nut 15 which is screwed onto the sleeve 11.

The rear bearing 12 fits over a larger diameter portion of the sleeve 11 and rests against a shoulder 16 thereon and its outer race has a longitudinally slidable bearing at 17 in the cylindrical housing 8. An adjusting sleeve 18 is mounted in the cylindrical housing 8 and receives the outer race of the forward bearing 13 at its forward end having a shoulder 19 against which the race engages and the rear end of the sleeve 18 engages the outer race of the rear bearing 12.

The periphery of the adjusting sleeve 18 is provided with two pockets 20 having oppositely inclined bottom surfaces 21 and adjusting screws 22 are threaded into oppositely inclined bosses 23 formed integrally with the housing 8 and located so that the screws 22 engage at their inner ends the respective inclined surfaces 21 and extend at right angles to said surfaces. Lock nuts 24 are provided to hold the screws 22 in adjusted positions and the outer ends of the screws are squared so that they may be gripped for rotation.

The rear end of the driving sleeve 11 is provided with longitudinally extending clutch teeth 25 and a sliding clutch member 26 surrounds the exterior of the sleeve 11 and has clutch teeth 27 formed thereon and extending inwardly between the clutch teeth 25 of the sleeve. The sliding clutch 26 is provided with an annular groove 28 in which a clutch shifter 29 is located, said shifter being fixed to the inner portion of a shifting rod 30 which extends through the housing 8 and is manually operable, its operation being longitudinal sliding movement to effect axial sliding movement of the clutch member 26.

The outer drive pinion 31, which is a spiral bevel pinion gear, meshes with the outer ring gear 6 and is preferably formed as an integral part of a pinion sleeve 32. The pinion sleeve 32 has an inturned integral flange 32' for the purpose of strengthening the same. The pinion sleeve 32 is carried by two sets of ball bearings 33 and 34. The inner race of the rear bearing 33 engages a shoulder 35 formed by the ends of the pinion teeth and is held in place by a nut 36 screwed onto a threaded portion of the pinion sleeve and the inner race of the forward bearing 34 engages the opposite edge of said nut 36. The outer races of the bearings 33 and 34 engage respectively two telescoping adjusting sleeves 37 and 38 each of which has a shoulder 39 and 40 respectively which engage rear and forward edges of the respective rings. It may be here stated that the sleeves 37 and 38 are made separately and telescoping for facility in assembling and may be considered as an integral sleeve so far as operation in the present invention is concerned.

The sleeves 37 and 38 carry the ball bearings 33 and 34 and said sleeves are mounted in the housing 8 and are longitudinally slidable therein. Each of the sleeves is provided with an inclined surface 41 and 42 which surfaces are oppositely inclined and are engaged by the ends of adjusting screws 43 and 44, respectively, the adjusting screws being screwed into bosses 45 and 46 formed integrally with the housing 8. The adjusting screws are provided with lock nuts 24 to hold them in adjusted position and are squared on their outer ends for manipulation, these screws being substantially identical with the adjusting screws 21 although preferably of a larger size.

The forward end of the pinion sleeve 32 is provided with longitudinally extending clutch teeth 47, which teeth correspond with the clutch teeth 25 of the driving sleeve 11 and preferably lie within rearward extensions of said clutch teeth 25 and are arranged to receive between them the clutch teeth 27 of the clutch member 26 when it is slid rearwardly, which engagement will lock the driving sleeve 11 to the pinion sleeve 32 for rotation.

The inner driving pinion 48, which is a spiral bevel gear pinion, is preferably formed integral with a short shaft 49 and it meshes with the inner ring gear 7. The shaft 49 is carried by forward and rear ball bearings 50 and 51 respectively. The inner race of the forward bearing fits over a reduced portion of the shaft 49 and is held in place thereon by a nut 52. The outer race of the bearing 50 fits into an axial opening in the driving sleeve 11 and abuts against a shoulder 53 and a collar 54 engages the opposite edge of the outer race, said collar being screwed into the sleeve and held in place by pins 55 which structure rigidly retains the bearing in place both on the shaft and in the sleeve.

The inner race of the rear bearing 51 surrounds the shaft 49 near the pinion 48 and engages a shoulder 56 thereon and the outer race of this bearing lies within the pinion sleeve 32 and may have longitudinal movement therein. A clutch sleeve 57 is splined onto the shaft 49 and has clutch teeth 58 extending radially therefrom, which teeth 58 may be engaged by the inner extremities of the teeth 27 of the sliding clutch 26. Spacing sleeves 59 and 60 are interposed between the inner race of the bearing 51, the clutch sleeve 57 and the inner race of the bearing 50, all surrounding the shaft 49, whereby these parts are rigidly clamped between the nut 52 and the shoulder 56.

A speedometer drive gear is effectively included in this structure which comprises a gear 59 fixed to the differential casing 5 and the gear 65 mounted on a shaft 61. The shaft 61 has bearing in a bushing 62 threaded into the housing 8 and is connected with the conventional flexible shaft which drives the speedometer. The hub of the gear 65 is attached to the inner end of the shaft 61 by suitable easily detachable means such as cotter pin as shown.

*Operation of structure of Fig. 1*

It will be seen that the aforedescribed construction provides a driving gear having two sets of driving pinions and ring gears the ratios of which are different. Both sets of gears are in constant mesh and either may be connected by the clutch member 26 to be driven by the driving shaft 10. If the clutch is in neutral position as shown in Fig. 1 with its teeth 27 out of engagement with either the teeth 58 or 47 the driving sleeve 11 which carries the clutch 26 and is driven by the shaft 10 rotates freely without imparting motion to either of the pinions 31 or 48.

Movement of the clutch 26 in a forward direction actuated by sliding the rod 30 engages the teeth 27 of the clutch member with the teeth 58 of the clutch sleeve 57 which is splined to the shaft 49 thus connecting the driving sleeve 11 with said shaft 49 and rotating the pinion 48 which drives the inner ring gear 7. In this movement the outer pinion 31 is idle and is rotated by the outer ring gear 6 which rotates simultaneously with the ring gear 7. When the clutch member 26 is moved in the opposite direction its teeth 27 engage with the teeth 47 of the pinion sleeve 32 which disconnects the shaft 49 from the driving sleeve 11 and connects the pinion sleeve 32 therewith and in this position the pinion 31 will be rotated to drive the outer ring gear 6 and the pinion 48 will run idle, being driven by the ring gear 7.

In these rotating movements the driving sleeve is supported by its ball bearings 12 and 13 in the housing 8 or the adjusting sleeve 18 which is supported in the housing and the pinion sleeve 32 is carried at its bearings 33 and 34 which are supported in the adjusting sleeves 37 and 38 which are supported by the housing 8 and therefore the members 11 and 32 may be assumed to have bearing directly upon the housing. The shaft 49 of the inner pinion 48 is carried at its rear end by the bearing 51 which is supported by the pinion sleeve 32 and at its forward end by the bearing 50 which is supported in the driving sleeve 11.

Therefore the shaft 49 is supported by bearings in two rotating members but the strain and wear on these bearings is considerably reduced because of the fact that the rotating members which support them also rotate in the same direction reducing the speed of rotation of the bearings. When the driving sleeve 11 is clutched to drive the shaft 49 there is no rotation of the bearing 50 since the parts rotate in unison and during this movement the pinion sleeve 32 is rotated in the same direction as the shaft 49 but at a different speed so that the rotation of the bearing 51 itself is minimized. When the sleeve 11 is clutched to drive the pinion sleeve 32 both bearings 50 and 51 will rotate but the pinion 48 being rotated in the same direction but at somewhat different speed materially reduces the travel of said bearings.

Facility for adjusting the clearance between each set of pinions and ring gears is clearly desirable and in this structure the outer pinion 31 is adjusted axially by the adjusting screws 43 and 44 which move the adjusting sleeves 37 and 38 lengthwise of the housing 8. Loosening one of the screws and tightening the other moves the sleeves in one direction and the reverse operation moves the sleeves in the opposite direction and the movement of the sleeves causes like movement of the pinion sleeve 32 because said sleeve is directly mounted upon the adjusting sleeve by its bearings. This adjusting movement has no effect upon the inner pinion 48, the outer race of the bearing 51 being longitudinally slidable in the sleeve 32.

Adjustment of the inner pinion 48 is accomplished by movement of the adjusting sleeve 18 caused by operation of the adjusting screws 22, these screws being reversely turned to move the sleeve in either direction desired which movement is transmitted to the driving sleeve 11 through the bearings 12 and 13 and movement of the sleeve 11 is transmitted to the shaft 49 through the bearing 50.

In this structure each of the pinions 31 and 48 may be axially adjusted relative to its respective ring gear independently of each other and this adjustment is made entirely from the outside of the casing is a most convenient manner. The adjustment may be made if desired while the gears are in driving operation.

The arrangement of the speedometer drive gears utilizes a space in the housing which is otherwise unoccupied and provides a most simple manner of driving the speedometer directly from the rear axle which is necessary with a construction of this nature wherein the speed of other moving parts is variable with relation to the axle speed. The gear 60 is readily assembled or disassembled with relation to the shaft 61 when the housing 8 is detached from the housing 1 by reaching into the open end of the housing 8 and removing the cotter pin or other attachment whereupon the gear may be slipped off the end of the shaft 61 and removed and the shaft 61 withdrawn from the bushing 62.

Figure 2:
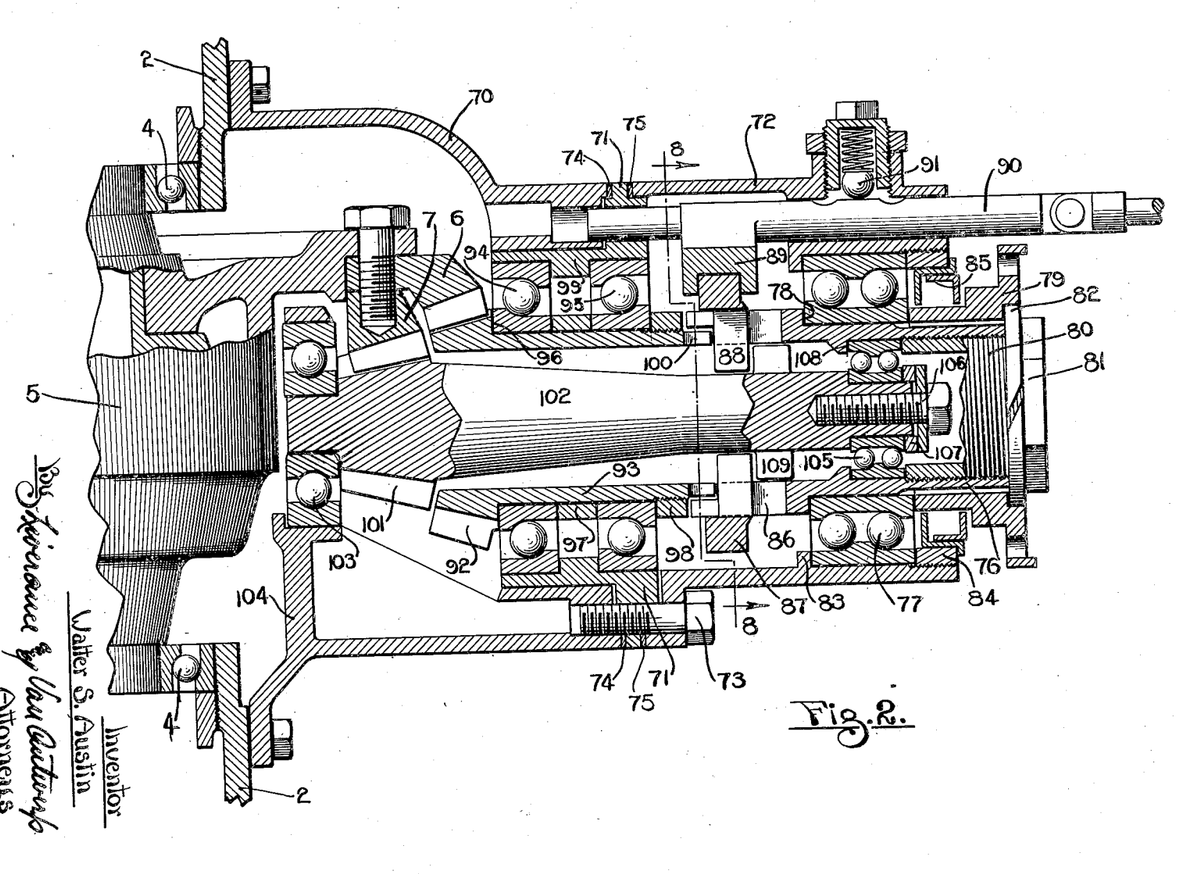
Fig. 2 is an axial sectional view of a modified form of a device embodying the invention.

Description of structure of Fig. 2

The structure shown in Fig. 2 has a housing formed of the two parts 70 and 72, the first housing part 70 having an open rear end and being fastened to the gear housing 1 in a conventional manner. A bearing holder 71 joins the forward open end of the first housing part 70 and the second housing part 72 joins the bearing holder 71, the three members 70, 71 and 72 being in alinement and being fastened together by means of screws 73 which extend through flanges on the members 72 and 71 and are threaded into openings in the housing 70. Shims 74 and 75, which are preferably segments such as half circles, are located between the joining surfaces of the three members and may be removed or replaced by thicker or thinner shims to adjust the relative longitudinal positions of the members.

A driving sleeve 76 is located within the second housing part 72 and is supported by a double ball bearing 77 which is of the double end thrust type. The innner race of the bearing 77 fits over the exterior of the sleeve 76 and abuts against a shoulder 78 thereon and is held in this position by a portion 79 of a universal joint or other driving connection which is splined to the exterior of the sleeve 76 and has its rear end abutting the inner race of said bearing. The driving member 79 is held in position by a threaded retaining sleeve 80 which is screwed into the interior of the drive sleeve 76 and its head 81 engages a washer 82 which bears against the outer end of the drive member 79. The outer race of the bearing 77 bears against a rib 83 on the interior of the second housing part 72 and is held in place by a threaded collar 84 screwed into the end of the housing. This construction mounts the driving sleeve 76 for rotation wholly upon the second housing part 72 and also positively prevents axial movement of the sleeve relative to the said housing member. A grease retainer 85 of conventional form is used in the collar 84.

The rear end of the driving sleeve 76 is provided with longitudinally extending clutch teeth 86 and a sliding clutch member 87 surounds this portion of the driving sleeve and is provided with inwardly extending clutch teeth 88 which extend between the teeth 86. An arcuate clutch shifter 89 embraces the periphery of the clutch member 87, being provided with a groove on its inner face for that purpose, and the clutch shifter is supported by, and preferably formed integrally with, a shifting rod 90 which has sliding bearings in the bearing holder 71 and in the housing member 72. The shifting rod 90 is adapted for manual operation and a spring actuated retainer of conventional design indicated generally at 91 is provided to yieldably hold the rod with its connected parts in any of its operative positions.

The outer driving pinion 92, which is a spiral bevel gear pinion, meshes with the outer ring gear 6 and is preferably formed integral with a pinion sleeve 93, similar to the spiral bevelled pinion 31 on sleeve 32. The sleeve 93 is rotatably supported upon ball bearings 94 and 95. The inner races of the bearings 94 and 95 fit over the exterior of the sleeve 93 and the rear bearing abuts against a shoulder 96 on the sleeve. A spacing ring 97 is interposed between the inner races of the bearings 94 and 95 and a nut 98 is screwed onto the sleeve against the end of the inner race of the bearing 95 to hold both bearings in fixed position upon the sleeve.

The outer races of the bearings 94 and 95 are located in, and supported by, the bearing holder 71, both abutting against a rib 99 on said holder which retains them in proper spaced relation. This construction rotatably supports the sleeve 93 and the pinion 92 on the bearing holder 71 and also prevents end movement of the sleeve and pinion relative to the bearing holder. The forward end of the sleeve 93 is provided with clutch teeth 100 which correspond with the clutch teeth 86 of the driving sleeve 76 and preferably extend within rearward extensions of said teeth and the clutch teeth 88 of the clutch member 87 are moved to extend between the clutch teeth 100 and when so located the teeth 88 are in engagement with the overlapping portions of the teeth 100 and the teeth 86.

An inner driving pinion 101, which is also a spiral bevel gear pinion, meshes with the inner ring gear 7 and is preferably formed integral with the pinion shaft 102 which shaft extends through the pinion sleeve 93 and into the driving sleeve 76, the construction being very similar to pinion 48 on shaft 49 in the first described form. The forward end of the shaft 102 is rotatably supported by a ball bearing 103 which is supported by a so-called basket 104 formed as a part of the first housing part 70 and the outer race of the bearing 103 is mounted for axial movement in said basket. The forward end of the shaft 102 is supported by a ball bearing 105, substantially identical with the ball bearing 50 and mounting previously described, of the double end thrust type, the inner race of which surrounds a reduced portion of the shaft and abuts against a shoulder thereon and is held in place by a screw 106 threaded into the end of the shaft and having two washers 107 which engage the bearing race and the head of the screw respectively. The outer race of the bearing 105 fits within the driving sleeve 76 and abuts against a shoulder 108 thereon being held in place by the inner end of the retaining sleeve 80.

This structure rotatably mounts the rear end of the shaft 102 in the first housing part 70 while the forward end of the shaft is rotatably supported in the driving sleeve 76. The shaft 102 is held with respect to end movement by the sleeve 76 and its rear end may move relative to the first housing part 70 by virtue of longitudinal movement of the bearing 103 in the basket 104. The shaft 102 near its forward end is provided with clutch teeth 109 extending radially therefrom and in position to be engaged by the inner ends of the clutch teeth 88 when the clutch member 87 is moved forwardly.

*Operation of structure of Fig. 2*

In this device it is to be assumed that the driving shaft is connected to the driving member 79 in a suitable manner as by a universal joint and when so connected it will drive the driving sleeve 76 which is carried entirely by the bearing 77 in the second housing member 72. When the clutch 87 is in neutral position as shown in Fig. 2, that is, with its teeth 88 located between and out of engagement with the clutch teeth 100 and 109, the driving sleeve 76 will rotate freely without imparting motion to any other part excepting the clutch member 87.

Movement of the clutch member 87 rearwardly moves the teeth 88 between and into engagement with the clutch teeth 100 of the pinion sleeve 93, said teeth 88 remaining in engagement with the teeth 86 and especially the parts of said teeth 86 which overhang the teeth 100 and thus a driving connection is formed between the pinion sleeve 93 and the driving sleeve 76 which rotates the pinion 92 and drives the outer ring gear 6. When so driven the pinion sleeve 93 rotates in its bearings 94 and 95 which are supported by the bearing holder 71 and the inner pinion 101 is driven by the inner ring gear 7 which rotates with the outer ring gear 6. Rotation of the inner pinion is an idle movement and its shaft 102 is carried by the bearings 103 and 105.

Reverse or forward movement of the clutch 87 will move its teeth 88 between and into engagement with the clutch teeth 109 of the pinion shaft 102 forming a driving connection between said shaft and the driving sleeve 76 and when so connected the sleeve 76 will rotate the shaft 102 and the pinion 101 and drive the inner ring gear 7. During this movement the outer pinion 92 is driven in an idle movement by the outer ring gear 6.

It is to be understood that the ratios between the sets of gears 92 and 6 and 101 and 7 are different so that different speeds will be imparted to the rear axle relative to the speed of the driving shaft. The bearing 105 supporting the forward end of the pinion shaft 102 and located within the driving sleeve 76 is necessarily small but in this respect it is to be noted that the speed of rotation of this bearing when the clutch is in one of its driving connections is relatively low while with the clutch in its other driving connection this bearing has no rotation whatever. When the clutch is moved to connect the sleeve 76 with the pinion shaft 102 said shaft and sleeve rotate together and the bearing 105 has no rotation but merely serves to withstand the end thrust of the shaft 102 to retain the pinion 101 in mesh with the gear 7.

When the clutch is moved to connect the sleeve 76 with the pinion sleeve 93 the gear 7 rotates the pinion 101 and its shaft 102 in the same direction as rotation of the sleeves 93 and 76 but at a different speed. However the difference in speed is not great and therefore rotation of the bearing 105 is relatively small.

Adjustment of the clearance between the pinion 92 and the ring gear 6 is obtained by axial adjustment of the pinion which is accomplished by movement of the bearing holder 71 on which the pinion sleeve 93 is fully supported. This movement or adjustment of the bearing holder 71 is obtained by selection of the proper thickness of shims 74 between the flange of the bearing holder and the end of the first housing part 70.

Adjustment of the clearance between the inner pinion 101 and the ring gear 7 is obtained by moving the second housing part 72 axially which housing carries the driving sleeve 76 on the bearings 77 and the driving sleeve in turn holds the pinion shaft 102 in the bearing 105 against longitudinal movement. This movement or adjustment of the second housing part 72 is accomplished by selection of the proper thickness of the shims 75 between the flange of the housing and the bearing holder 71. These gear clearance adjustments are hence accomplished merely by loosening the screws 73 which permits removal and insertion at will of the segmental shims 74 and 75 and after shims of proper thickness have been selected and inserted the screws 72 are tightened holding the whole assembly firmly together with the gears in proper mesh.

Figure 3:
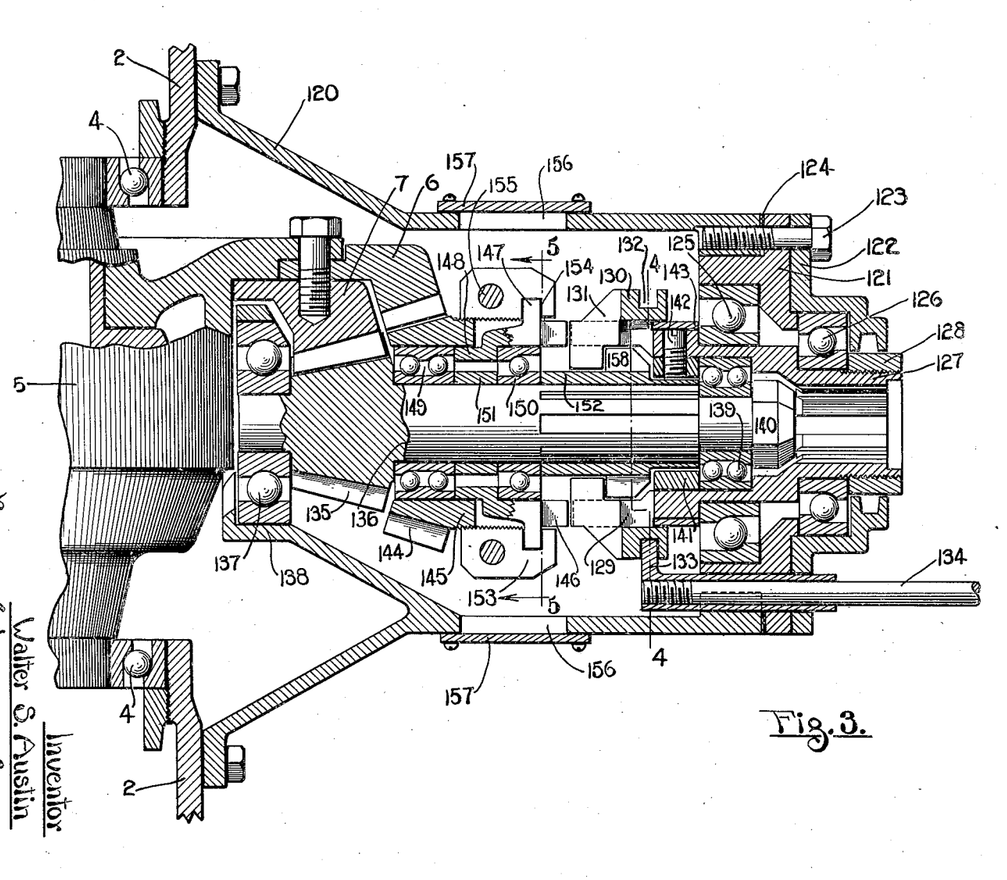
Fig. 3 is an axial sectional view of a second modified form of a device embodying the invention.
Figure 4:
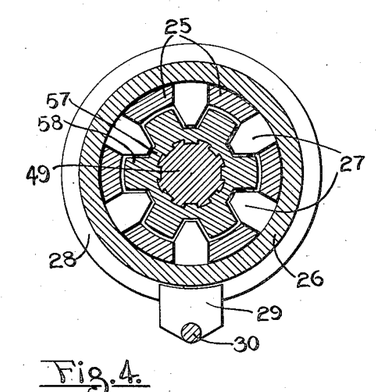
Fig. 4 is a transverse section taken on the line 4—4 of Fig. 1 and also representing a section on the line 4—4 of Fig. 3 which structures are substantially identical in the parts shown at this section.
Figure 5:
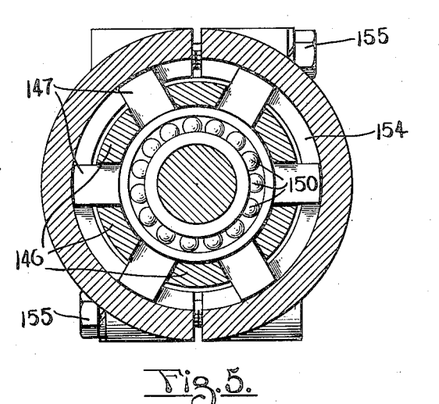
Fig. 5 is a transverse section on the line 5—5 of Fig. 3.
Figure 6:
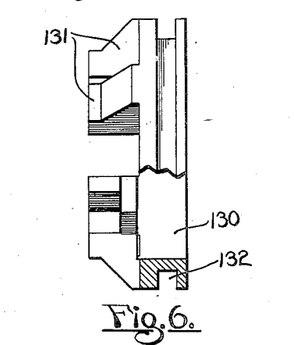
Fig. 6 is a side elevation with a portion shown in section of the sliding clutch member of the structure shown in Fig. 3.
Figure 7:
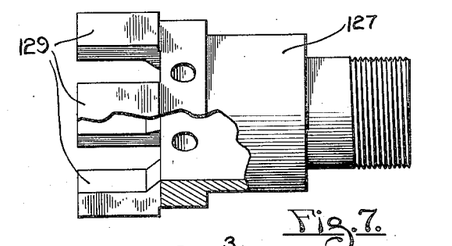
Fig. 7 is a side elevation with a portion shown in section of the driving sleeve and clutch member of the structure shown in Fig. 3.
Figure 8:
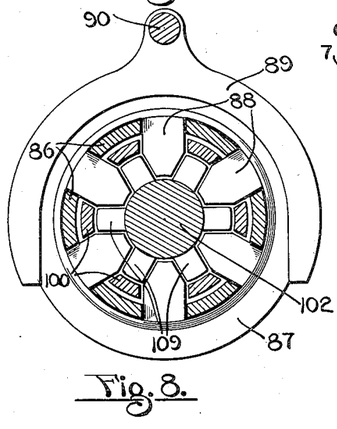
Fig. 8 is a transverse section on the line 8—8 of Fig. 2.
Figure 9:
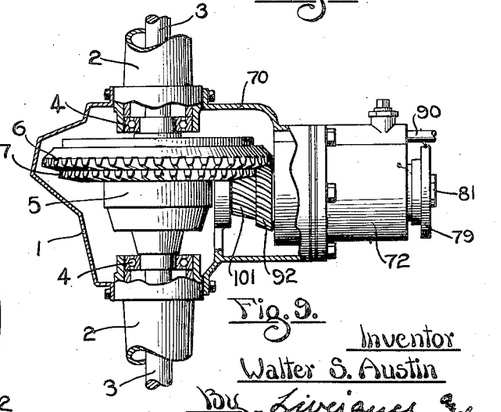
Fig. 9 is a reduced size plan view, partially in section, of the center portion of a conventional automobile rear axle housing including the axle differential gear casing and ring gears and showing an exterior view of the structure illustrated in Fig. 2 operatively applied thereto.

*Description of structure of Fig. 3*

The structure illustrated in Fig. 3 has a housing 120 which is suitably attached to the gear housing 1 as by screws extending through a flange. The forward end of the housing 120 is provided with a bearing holder 121 outside of which is a cap 122, both members being attached to the end of the housing 120 by means of screws 123 and shims 124 are located between the end of the housing 120 and the bearing holder 121. The shims are preferably segmental such as semi-circular so that they may be readily removed or inserted after the screws have been loosened and without removal of the bearing holder.

A ball bearing 125 is mounted in the bearing holder 121 and the ball bearing 126 is located in the cap 122 which bearings rotatably support a driving sleeve 127. The inner races of the bearings 125 and 126 surround different diameters of the driving sleeve 127 and abut against shoulders thereon. The inner race of the forward bearing 126 is retained in position against its abutting shoulder by a collar 128 screwed over the end of the sleeve 127. The outer race of the rear bearing 125 fits into the bearing holder 121 and abuts at its forward edge against a shoulder thereon and the outer race of the forward bearing 126 fits within the cap 122 and abuts at its rear edge against a shoulder of the holder 121. Because of the construction of these bearings whereby they take end thrusts in opposite axial directions and their mounting in the structure as described the sleeve 127 is rotatably mounted in the bearing holder 121 and cap 122 so that no end movement relative to said holder and cap is permitted.

The rear end of the driving sleeve 127 is provided with longitudinally extending clutch teeth 129 and is surrounded by a sliding clutch member 130 which has inwardly extending clutch teeth 131 lying between the clutch teeth 129. The periphery of the clutch member 130 is provided with a groove 132 which receives a clutch shifter 133. The clutch shifter extends through the bearing holder 121 and cap 122 and has sliding movement thereon and is provided with a shifting rod 134 for manual operation.

The inner driving pinion 135, which is a spiral bevel gear pinion, meshes with the inner ring gear 7 and is preferably formed integral with the pinion shaft 136. The rear end of the pinion shaft is rotatably mounted in a ball bearing 137, the outer race of which is supported by a so-called basket 138 formed as a part of the housing 120. The bearing 137 is axially movable in its basket support 138 to provide for axial adjustment of the shaft 136 and pinion 135. The forward end of the shaft 136 extends into the interior of the driving sleeve 137 and is rotatably supported by a bearing 139 which bearing is of the double end thrust type like bearings 50 and 105. The inner race of the bearing 139 surrounds a reduced portion of the shaft 136 and is held in place by a nut 140 screwed onto the end of the shaft.

The outer race of the bearing 139 fits within the interior of the sleeve 127 and abuts at its forward edge against a shoulder thereon and its rear edge is engaged by a retaining ring 141 which is held in place by pins 142, one of which is shown. A band 143 surrounds the periphery of the sleeve 127 opposite the pins 142 for the purpose of preventing the pins from becoming displaced and also to provide a smooth surface outside of the pins for the clutch member 130 to slide upon. This construction rotatably mounts the forward end of the shaft 136 in the sleeve 127 and prevents movement thereof relative to said sleeve.

The outer spiral bevel driving pinion 144 is preferably formed integral with a pinion sleeve 145 which is provided with longitudinally extending teeth 146 at its forward end, the forward ends of said teeth being utilized as clutch teeth and corresponding with the clutch teeth 129 of the driving sleeve 127 and engageable with the clutch teeth 131 of the clutch member 130. The rear portions of the teeth 146 engage with lateral extensions 147 of a bearing adjuster 148.

The pinion sleeve 145 is rotatably supported by the shaft 136 on two sets of ball bearings 149 and 150. The inner races of the bearings 149 and 150 surround the shaft 136 and the rear edge of the rear bearing 149 engages a shoulder adjacent the pinion 135 on the shaft. A spacing collar 151 separates the inner races of the bearings 149 and 150 and the forward edge of the forward bearing 150 is engaged by the rear edge of a clutch sleeve 152 and is splined to and surrounds the forward portion of the shaft 136. The sleeve 152 has clutch teeth 158 formed integrally therewith. The forward edge of the sleeve 152 is engaged by the rear edge of the inner race of the bearing 139. By means of this construction the nut 140 retains all of the bearings 139, 149 and 150 in fixed longitudinal position upon the shaft 136.

The outer races of the bearings 149 and 150 are received by the interior of the pinion sleeve 145 and are retained in spaced apart relation by an annular bearing adjuster 148, said adjuster having lateral extensions 147 extending outwardly between the teeth 146. The exterior of the sleeve 145 is threaded and an adjusting collar 153 is screwed thereon, said collar having an inner annular groove 154 which receives the extensions 147. The collar 153 is preferably split into two semi-circular portions which are fastened together by screws 155 and by means of which the collar may be firmly clamped upon the exterior of the sleeve.

By this construction adjustment of the pinion sleeve 145 lengthwise of the shaft 136 may be obtained by loosening the screws 155 and rotating the threaded collar 153 upon the sleeve 145 which collar is located relative to the bearings 149 and 150 by means of the extensions 147 of the adjusting member 148 firmly located between said bearings, said bearings being held in fixed longitudinal position on the shaft 136. Openings 156 are provided in the housing 120 opposite the adjusting collar 153 through which tools may be inserted to manipulate the screws 155 and to adjust the collar and covers 157 to close said openings.

*Operation of structure of Fig. 3*

Assuming that suitable driving means is attached to the driving sleeve 127 by a splined connection and that the clutch 130 is in neutral position as shown in Fig. 3 with its teeth 131 lying between and out of engagement with the teeth 146 and 158, rotation of the sleeve will be an idle movement. Movement of the clutch member 130 rearwardly moves the teeth 131 into engagement with the teeth 146, said teeth 131 remaining in engagement with the teeth 129 thereby locking the driving sleeve 127 to the pinion sleeve 145. When the parts are in this position and rotated the outer pinion 144 drives the outer ring gear 6 and the inner ring gear 7 rotates the inner pinion 135, the shaft 136 of which rotates idly upon the bearings 137, 139, 149 and 150.

When the clutch 130 is oppositely shifted in a forward direction the clutch teeth 131, extending inwardly between the clutch teeth 129, engage the clutch teeth 159 on the sleeve 152 and lock the driving sleeve 127 to the pinion shaft 136 to which the sleeve 152 is splined.

When driven with the parts in these positions the inner pinion 135 will drive the inner ring gear 7 and the outer ring gear 6 will rotate the outer pinion 144 causing its sleeve 145 to rotate idly upon the bearings 149 and 150. The bearings 139, 149 and 150, being located within the sleeves 127 and 145, respectively, are relatively small but these bearings do not travel at a high speed under any power transmitting conditions. The only bearings which rotate at full driving speeds are the exteriorly located bearings 125, 126 and 137. The bearings 139 will rotate at full speed when the clutch is in neutral position and the sleeve 127 rotating idly and not transmitting power.

When the clutch is moved forwardly to lock the pinion shaft 136 with the driving sleeve 127 the bearing 139 has no rotation under such power transmitting conditions and the bearings 149 and 150 rotate at relatively low speeds because the pinion 144 and sleeve 145 are being rotated in the same direction as the shaft 136 but at a somewhat different speed causing relatively slow rotation of said bearings 149 and 150. When the clutch is moved to connect the pinion sleeve 145 with the driving sleeve 127 the bearings 139, 149 and 150 will rotate at a speed which is the difference between the rotation of the sleeves 127 and 145 and the shaft 136, said shaft being rotated in the same direction but at a different speed.

Axial adjustment of the inner pinion 135 for proper clearance relative to the its gear 7 is accomplished by loosening the screws 123 and by changing the segmental shims 124 to proper thickness after which the screws 123 are tightened.

Axial adjustment of the outer pinion 144 to provide proper clearance relative to its gear 6 is accomplished by removing the covers 157 providing access through the openings 156 to the adjusting collar 153 and the screws 155. After loosening the screws the collar may be rotated upon the sleeve 145 and because of its threaded connection therewith such rotation causes longitudinal movement of the sleeve, said collar being held in fixed longitudinal position by means of its connection with the extensions 147 and the adjusting member 148 rigidly maintained between the bearings 149 and 150. After proper adjustment the screws are tightened and the cover 157 replaced.

*General explanation*

Although the invention has been herein disclosed in three modifications of structures, all of the forms shown and others not herein disclosed embody the same general features which are of importance in a gearing of this nature.

In the first place it is considered desirable to employ the so-called spiral bevel gear and pinion for transmitting the power in its different gear ratios and the action of such gears is that end thrust, particularly in the pinions, will occur in each direction under normal driving conditions which is distinguishable from ordinary or straight bevel gears and pinions in which the tendency is always to separate the gears causing an end thrust in one direction only. Each of the forms of the present invention provides bearing means and supports therefor which will withstand axial thrust of the pinions in either direction.

Another feature in common with all forms of the invention is that the forward end of the pinion shaft of each of the inner pinions is mounted on a bearing within the driving sleeve in a manner whereby the end thrust of the inner pinion is transmitted through said bearing to driving sleeve and thence through the bearings in which the driving sleeve is mounted on the housing and longitudinal adjustment of each inner pinion for proper clearance relative to its ring gear is obtained by longitudinal adjustment of the driving sleeve.

Another feature in common with all forms of the invention is that the outer pinion and its sleeve are supported on bearings in a manner to be adjusted longitudinally independently of adjustment of the inner pinion and its shaft whereby the inner and outer pinions may be accurately and separately adjusted relative to their respective ring gears.

Another feature common to all forms of the invention is that all bearings located interiorly of rotating parts which necessitates relatively small bearings in such locations are either nonrotative or slowly rotated during the transmission of power by their respective parts.

Another feature common to all forms of the invention is that longitudinal adjustment of both the inner and the outer bevel pinions relative to their respective ring gears can be attained entirely from the outside of the housing and requires no disassembling of the structure.

It is to be understood that the bearing holders or bearing holder sleeves 18, 37 and 38 in Fig. 1, 71 in Fig. 2 and 121 in Fig. 3 are mainly for the purpose of longitudinal adjustments of the bearings and the bearings may be mounted directly in the housing in analogous structures not specifically shown.

The invention is defined in the appended claims and is to be considered comprehensive of all forms of structure coming within their scope.

I claim:

1. A change speed gearing comprising, two bevel ring gears of different diameters rotatable upon a common axis, a suitable housing, two bevel pinions meshing respectively with said ring gears, means for mounting both pinions for rotation supported by said housing and means accessible from the exterior of said housing for longitudinally adjusting said bevel pinions independently of each other and relative to their respective ring gears.

2. A change speed gearing comprising, two bevel ring gears mounted for rotation upon a common axis, a suitable housing, an inner and outer bevel pinion meshing respectively with said ring gears, a pinion sleeve fixed to the outer pinion, a shaft fixed to the inner pinion, means for mounting said pinion sleeve for rotation supported by said housing, a driving member rotatably supported by said housing, means for partially supporting said shaft for rotation in said driving member, means for holding said shaft against longitudinal movement in either direction relative to said driving member, said last mentioned means being located on the driving member and means for adjusting said driving member longitudinally.

3. A change speed gearing comprising, two bevel ring gears mounted for rotation upon a common axis, a suitable housing, an inner and outer bevel pinion meshing respectively with said ring gears, a pinion sleeve fixed to the outer pinion, a shaft fixed to the inner pinion, means for mounting said pinion sleeve for rotation supported by said housing, a driving member rotatably supported by said housing, means for adjusting said driving member longitudinally and means for holding said shaft in fixed longitudinal relation to said driving member.

4. A change speed gearing comprising, two bevel ring gears mounted for rotation upon a common axis, a suitable housing, an inner and outer bevel pinion meshing respectively with said ring gears, a pinion sleeve fixed to the outer pinion, a shaft fixed to the inner pinion, means for mounting said pinion sleeve for rotation supported by said housing, a driving member rotatably supported by said housing, means for partially supporting said pinion shaft for rotation on said driving member, said shaft supporting means holding said shaft in fixed longitudinal relation to said driving member, means for adjusting said driving member longitudinally relative to said ring gears, and means for adjusting said pinion sleeve and outer pinion longitudinally of their axis independently of longitudinal adjusting of the said inner pinion and associated parts.

5. A change speed gearing comprising, two bevel ring gears mounted for rotation upon a common axis, a housing, an inner and outer bevel pinion meshing respectively with said ring gears, a pinion sleeve fixed to the outer pinion, a shaft fixed to the inner pinion, means for mounting said pinion sleeve for rotation supported by said housing, a driving member rotatably supported by said housing, means for partially supporting said shaft for rotation in said driving member, said shaft supporting means holding said shaft in fixed longitudinal relation to said driving member, means for adjusting said driving member longitudinally relative to said ring gears, and means for adjusting said pinion sleeve and outer pinion longitudinally of their axis independently of longitudinal adjusting of the said inner pinion and associated parts, both of said adjusting means being operable from the exterior of the housing.

6. A change speed gearing comprising, two bevel ring gears of different diameters mounted upon a common axis, an outer and an inner pinion meshing respectively with said ring gears, a pinion sleeve attached to said outer pinion, a pinion shaft attached to the inner pinion, a driving member, means for selectively connecting said driving member with either said pinion sleeve or said pinion shaft, a bearing located within said driving member for rotatably supporting said pinion shaft in said driving member and for holding said shaft in fixed longitudinal relation in both directions, to said driving member, a housing, bearings for rotatably supporting said driving member, pinion sleeve and pinion shaft, upon said housing, and means for longitudinally adjusting the driving member relative to the said ring gears.

7. A change speed gearing comprising, two bevel ring gears mounted on a common axis, a housing fixed relative to the axis of the ring gears, an inner and outer bevel pinion meshing respectively with said ring gears, a pinion sleeve attached to said outer bevel pinion, a pinion shaft attached to said inner bevel pinion, a pinion sleeve bearing rotatably supporting said pinion sleeve and carried by said housing, means for adjusting said pinion sleeve bearing longitudinally of its axis, said adjusting means being operative from the exterior of said housing, a driving member, a driving member bearing rotatably supporting said driving member and carried by said housing, means for adjusting the driving member bearing longitudinally of its axis, said adjusting means being operative from the outside of the housing, clutch means for selectively connecting said driving member with either said pinion sleeve or said pinion shaft, a rear bearing for said pinion shaft carried in the interior of said pinion sleeve and a forward pinion shaft bearing surrounding said pinion shaft and carried in the interior of said driving member, said forward pinion bearing serving to maintain said pinion shaft and driving member in fixed longitudinal relation.

8. A change speed gearing comprising two bevel ring gears mounted on a common axis, a suitable housing, an inner and an outer bevel pinion meshing respectively with said ring gears, a pinion sleeve attached to said outer pinion, a pinion shaft attached to said inner pinion and extending through said pinion sleeve, a pinion sleeve bearing holder mounted on said housing, means for adjusting said pinion sleeve bearing holder axially of the axis of the bearing sleeve, a bearing rotatably supporting said pinion sleeve on said pinion sleeve bearing holder, said bearing maintaining fixed longitudinal relation between the pinion sleeve and the pinion sleeve bearing holder, a driving member, a driving member bearing holder supported by said housing and adjustable longitudinally of the axis of the driving member, a bearing rotatably supporting said driving member and carried by said driving member bearing holder, means for selectively connecting the driving member with either the pinion sleeve or the pinion shaft, a rear bearing surrounding the pinion shaft and carried in the interior of the pinion sleeve and a forward bearing surrounding said pinion shaft and carried in the interior of said driving member, said forward bearing serving to maintain fixed longitudinal relation between said pinion shaft and said driving member.

9. The elements in combination defined in claim 8 in which the means for adjusting said pinion sleeve bearing holder and said driving member bearing holder are operative from the outside of the housing.

10. A change speed gearing comprising two bevel ring gears mounted on a common axis, a suitable housing, an inner and an outer bevel pinion meshing respectively with said ring gears, a pinion sleeve attached to said outer pinion, a pinion shaft attached to said inner pinion, a pinion sleeve bearing rotatably supporting said pinion sleeve and supported by said housing, a pinion sleeve bearing holder engageable with said pinion sleeve bearing to move said bearing axially in either direction, said bearing holder being located within said housing, a driving member, a driving member bearing rotatably mounting said driving member and supported by said housing, a driving member bearing holder longitudinally slidable within the housing and engageable with said driving member bearing to adjust and maintain longitudinal relation between said bearing and said ring gears, means for selectively connecting the driving member with either the pinion sleeve or the pinion shaft, means for rotatably supporting the rear end of the pinion shaft, a bearing rotatably supporting the forward end of the pinion shaft in said driving member, said pinion shaft bearing serving to maintain fixed longitudinal relation between the said shaft and driving member.

11. The elements in combination defined in claim 10 combined with means for adjusting said pinion sleeve bearing holder and said driving member bearing holder relative to said ring gears, said adjusting means being operative from the exterior of the housing.

12. A change speed gearing comprising two bevel ring gears mounted on a common axis, a first part of a housing, an inner and outer beveled pinion meshing respectively with said ring gears, a pinion sleeve attached to said outer pinion, a pinion shaft attached to said inner pinion, a bearing holder adjustable longitudinally of the axis of the pinion sleeve, a pinion sleeve bearing surrounding said pinion sleeve and supported by said first part of the housing, said bearing rotatably supporting said pinion sleeve and maintaining fixed longitudinal relation between the pinion sleeve and the bearing holder, a second part of the housing longitudinally adjustable relative to said ring gears, a driving member bearing surrounding said driving member and carried by said second part of the housing, said driving member bearing rotatably supporting the driving member and maintaining fixed longitudinal relation between the driving member and the second part of the housing, clutch means for selectively connecting said driving member with either said pinion sleeve or said pinion shaft, a rear bearing carried by the first part of the housing and rotatably supporting one end of said pinion shaft, and a forward bearing carried in the interior of said driving member and surrounding said pinion shaft said forward bearing rotatably supporting the front end of the pinion shaft and maintaining fixed longitudinal relation between the pinion shaft and the driving member.

13. A change speed gearing comprising two bevel ring gears mounted on a common axis, a first part of the housing fixed relative to the axis of the ring gears, two bevel pinions meshing with the respective ring gears, a pinion sleeve fixed to one of said pinions, a pinion shaft fixed to the other of said pinions, a bearing holder supported by said first part of the housing and longitudinally adjustable therewith, a pinion sleeve bearing rotatably supporting the pinion sleeve and carried by the bearing holder, said pinion sleeve bearing maintaining fixed longitudinal relation between the pinion sleeve and the bearing holder, a second part of the housing supported by the first part of the housing and longitudinally adjustable relative to the first part, a driving member, a driving member bearing rotatably supporting the driving member and carried by said second part of the housing, said driving member bearing maintained in fixed longitudinal relation between the driving member and the second part of the housing, clutch means for selectively connecting the driving member with either said pinion sleeve or said pinion shaft and a pinion shaft bearing carried by said driving member and rotatably supporting said pinion shaft, said pinion shaft bearing serving to maintain fixed longitudinal relation between the pinion shaft and the driving member.

14. A change speed gearing comprising two bevel ring gears mounted for simultaneous rotation on a common axis, a first part of a housing fixed relative to the axis of the ring gears, two bevel pinions meshing respectively with said ring gears, a pinion sleeve fixed to one of said pinions, a pinion shaft fixed to the other of said pinions, a driving member, clutch means for selectively connecting the driving member with either the pinion sleeve or the pinion shaft, a bearing holder mounted at an end of said first part of the housing, a second part of the housing mounted adjacent said bearing holder, removable shims interposed between the first part of the housing and the bearing holder and the second part of the housing and the bearing holder, means for holding said bearing holder and said second part of the housing to said first part of the housing, a pinion sleeve bearing rotatably supporting said pinion sleeve on said bearing holder and maintaining fixed longitudinal relation between the same, a driving member bearing rotatably supporting the driving member on the second part of the housing and retaining fixed longitudinal relation between the same and a pinion shaft bearing rotatably supporting the pinion shaft on the driving member and maintaining fixed longitudinal relation between the same.

15. The elements in combination defined in claim 14 combined with a second pinion shaft bearing rotatably supporting said pinion shaft upon said first part of the housing.

16. A change speed gearing comprising, two bevel gears mounted on a common axis, an inner and an outer bevel pinion meshing respectively with said ring gears, a pinion sleeve attached to said outer pinion, a pinion shaft attached to said inner pinion, means for selectively driving either said pinion sleeve or said pinion shaft, means for rotatably supporting said pinion shaft, bearings for rotatably supporting said pinion sleeve, means for supporting said bearings and for maintaining them in fixed longitudinal relation perpendicularly to the axis of said ring gears, and adjusting means for retaining said bearings in longitudinal relation to said pinion sleeve, said adjusting means being capable of altering said longitudinal relation between each of said bearings and said sleeve an equal amount in the same direction.

17. A change speed gearing comprising, two bevel ring gears mounted on a common axis, a housing fixed relative to the axis of the ring gears, an inner and an outer bevel pinion meshing respectively with said ring gears, a pinion sleeve fixed to said outer pinion, a pinion shaft fixed to said inner pinion and extending through said pinion sleeve, means for mounting said pinion shaft for rotation supported by said housing, said mounting means serving to maintain said pinion shaft in fixed axial relation to said housing, bearings carried by said pinion shaft and rotatably supporting said pinion sleeve thereon, and means for holding said bearings in fixed longitudinal relation with said pinion shaft, adjusting means for maintaining said bearings in fixed longitudinal relation with said pinion sleeve, said adjusting means serving to alter said longitudinal relation between said bearings and said sleeve.

18. A change speed gearing comprising, two bevel ring gears mounted on a common axis, a housing fixed relative to the axis of the ring gears, an inner and an outer bevel pinion meshing respectively with said ring gears, a pinion sleeve fixed to said outer pinion, a pinion shaft fixed to said inner pinion and extending through said pinion sleeve, bearings for rotatably supporting said pinion shaft on said housing, said bearings serving to maintain fixed longitudinal relation between said shaft and said housing, adjusting means for altering the longitudinal relation between the pinion shaft and the housing, pinion sleeve bearings supported by said pinion shaft and rotatably supporting said pinion sleeve thereon, means for maintaining said pinion sleeve bearings in fixed longitudinal relation relative to said shaft and adjusting means for maintaining said pinion sleeve bearings in longitudinal relation relative to said pinion sleeve, said adjusting means serving to alter the longitudinal relation between said shaft and sleeve.

19. A bearing adjuster comprising a housing, a rotatable member within the housing, a bearing rotatably supporting said rotatable member on said housing, an adjusting member movable parallel with the axis of the bearing located within said housing and engaging said bearing to cause simultaneous axial movement thereof in either direction, and adjusting screws threaded in said housing and operable from the exterior thereof, said adjusting screws engaging said adjusting member and arranged by rotation of the screws to move the adjusting member in an axial direction and to retain the adjusting member in a desired location.

20. A change speed gearing comprising, two bevel ring gears of different diameters rotatable upon a common axis, an inner and an outer bevel pinion meshing respectively with said ring gears, a housing, means for mounting both pinions for rotation supported by said housing and means accessible from the exterior of the housing for longitudinally adjusting said inner bevel pinion relative to its respective ring gear.

21. The elements in combination defined in claim 20 in which the means for rotatably mounting both pinions also serves to hold said pinions against axial movement in either direction.

22. A change speed gearing comprising, two bevel ring gears rotatable on a common axis, a housing, an inner and an outer bevel pinion meshing respectively with said ring gears, means supported by said housing for rotatably mounting said outer bevel pinion, a pinion shaft attached to said inner bevel pinion, a driving member, clutch means for selectively connecting the driving member with either said outer pinion or said inner pinion, a bearing rotatably supporting said pinion shaft on said driving member, said bearing serving to maintain fixed longitudinal relation between the pinion shaft and driving member, a bearing rotatably supporting the driving member on said housing, said bearing being movable longitudinally relative to said housing, an adjusting member engageable with said bearing and arranged to move said bearing longitudinally relative to said housing and actuating means accessible from the exterior of the housing for moving and holding said adjusting member.

23. A change speed gearing comprising, two bevel ring gears mounted upon a common axis, an inner and an outer bevel pinion meshing respectively with said ring gears, a first part of a housing fixed relative to the axis of the ring gears, means for rotatably supporting said outer pinion upon said first part of the housing, a second part of the housing attached to the first part of the housing and adjustable relative thereto in a direction longitudinally of the axis of the pinions, a driving member, means for rotatably mounting said driving member in said second part of the housing and for retaining the driving member in fixed longitudinal relation to the second part of the housing, a pinion shaft attached to the inner pinion, and a bearing rotatably mounting said pinion shaft on said driving member and maintaining fixed longitudinal relation between the pinion shaft and the driving member.

WALTER S. AUSTIN.